April 13, 1965 R. H. STANGE 3,177,704
LEAK TESTING METHOD
Filed Aug. 28, 1962

INVENTOR.
ROBERT H. STANGE
BY D. E. Hodges
Thomas O. Watson Jr.
ATTORNEYS.

3,177,704
LEAK TESTING METHOD
Robert H. Stange, Baltimore, Md., assignor to the United States of America as represented by the Secretary of the Navy
Filed Aug. 28, 1962, Ser. No. 220,106
6 Claims. (Cl. 73—49.3)
(Granted under Title 35, U.S. Code (1952), sec. 266)

The invention described herein may be manufactured and used by or for the Government of the United States of America for governmental purposes without the payment of any royalties thereon or therefor.

This invention relates to leak testing methods, and more particularly to methods for making quantitative determinations of the leak rates of pressure vessels charged with dry permanent gases.

In the past many methods have been proposed for checking the integrity of pressure vessels. For example, pressure vessels were charged with Freon and the exterior surfaces were then checked with a flame detector or an electronic Freon detector to locate any leaks. Also, pressure vessels were charged with a gas and submerged in water; the appearance of bubbles rising from the vessel indicating the presence of leaks. Further, pressure vessels were charged with helium and exterior surfaces then checked using a helium sensitive probe. In addition to being expensive and frequently unreliable in operation, all of the above methods failed to give an accurate quantitative measure of leakage. The general purpose of the present invention is to provide leak testing methods which embrace all of the advantages of the prior art methods while possessing none of the aforedescribed disadvantages.

It is therefore a primary object of the present invention to provide new and improved methods of leak rate testing.

It is another object of the present invention to provide leak testing methods utilizing low order vacuums, which may be produced by conventional mechanical pumps, whereby outgassing problems are substantially avoided.

It is a further object of this invention to provide leak testing methods which will provide quantitative measurements of the leak rate of pressure vessels.

It is yet another object of this invention to provide leak testing methods for pressure vessels in which the effects caused by the presence of condensable vapors within the vacuum chamber are substantially eliminated.

It is yet a further object of the present invention to provide leak testing methods which will yield quantitative leak rate determinations solely by the measurement of pressure changes without the need for determining the exact pressures involved.

With these and other objects in view, the present invention contemplates a method including the steps of enclosing a pressure vessel charged with a dry permanent gas within a sealed chamber which closely surrounds the pressure vessel and provides a small known clearance volume therebetween. The clearance volume is then evacuated to provide a moderately high vacuum by means of a mechanical vacuum pump. A predetermined quantity of the same dry gas is then introduced into the clearance volume to produce a pressure rise therein which may correspond to the maximum allowable leak rate of the pressure vessel under test of any suitable increment thereof. The pressure within the clearance volume is measured by means of a McLeod gauge both before and after the introduction of the predetermined quantity of gas and the change in readings of the gauge noted to calibrate the gauge. The actual pressures involved may be determined although all that is essential to the calibration of the gauge for the purposes of the present invention is to note the change in the height of the mercury columns within the gauge both before and after the introduction of the gas. After a predetermined period of time, another reading is taken on the McLeod gauge and the change in the heights of the mercury columns within the gauge is then compared to the change produced by the introduction of the predetermined quantity of gas to obtain a quantitative measure of the leak rate of the pressure vessel under test. Alternatively, the introduction of the predetermined quantity of gas into the clearance volume may be omitted and the gauge calibrated to read actual pressures to obtain the same results.

Other objects, advantages and novel features of the invention will become readily apparent upon consideration of the following detailed description when read in conjunction with the accompanying drawings wherein.

Figure 1:
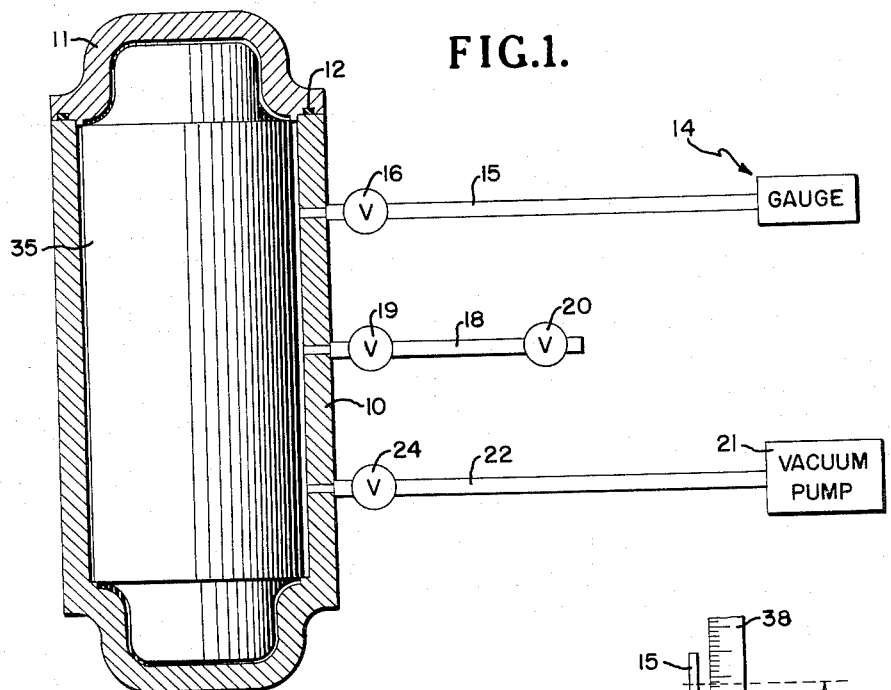
FIG. 1 is a schematic representation of an arrangement of apparatus suitable for practicing the methods of the present invention.

Attention is now directed to the drawing, wherein like numerals of reference designate like parts throughout the several views, and more particularly to FIG. 1. The apparatus utilized in practicing the present invention comprises a chamber 10 provided with a cover 11. The cover 11 is adapted to be clamped to the chamber 10 by any suitable means (not shown) and to be sealed thereto by means of an O-ring seal 12. The interior surfaces of the chamber 10 and cover 11 are tin plated because of the good degassing properties of a tin surface.

A McLeod gauge, designated generally by the reference numeral 14, is connected to the interior of the chamber 10 by means of a gauge line 15 having a valve 16 disposed therein. A calibrated leak line 18 is also connected to the interior of chamber 10 and is provided with valves 19 and 20 for a purpose to be subsequently described. A vacuum pump 21 is also connected to the interior of the chamber 10 by means of a pump line 22 provided with a shut-off valve 24.

Figure 2:
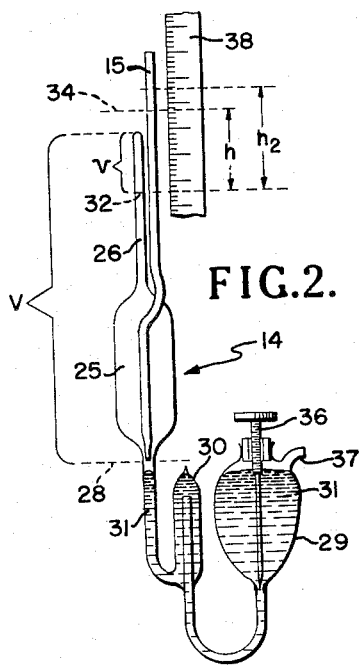
FIG. 2 is an illustration of a McLeod gauge with the mercury column lowered into the non-reading position.

Attention is now directed to FIG. 2 of the drawings for a description of the principle of operation and physical construction of the McLeod gauge. The principle of the McLeod gauge consists in isolating a known volume V of a gas at the unknown pressure $x$ and compressing the gas into a small known volume $v$, at which the pressure is measured. If $h$ is this pressure, then, according to Boyle's law:

$$x = h\frac{v}{V}$$

The McLeod gauge 14 comprises a bulb 25 with a narrow tube 26 at the top. The gauge line 15 projects through the wall of the bulb 25 and toward the bottom of the bulb, ending at the level designated 28. The bottom of the bulb 25 is connected to a mercury reservoir 29 through an air trap 30 which rids the mercury of air bubbles. If the mercury 31 is caused to rise into the bulb 25, the volume V is the volume of the bulb 25 together with that of the tube 26 which is cut off when the mercury reaches the level 28. The volume $v$ is the volume between the top of the tube 26 and a graduation 32 formed on the tube. When the mercury is raised until the level reaches the graduation 32 in tube 26, it will rise to a higher level 34 in the gauge line 15. If tubes 15 and 26 have the same diameter, the difference in level $h$, multiplied by the ratio of $v$ to $V$ in accordance with the aforementioned formula measures the initial pressure $x$ since the difference in level $h$ measures the pressure of the compressed gas so long as the initial pressure is very small compared with $h$, that is, so long as the ratio $V$ to $v$ is large enough.

Operation

The present invention may be practiced by using either of two methods, one method involving the measurement of absolute pressures and the other method involving the measurement of pressure changes. These two methods will be described in the above order.

A pressure vessel 35, charged to a super atmospheric pressure with a dry permanent gas such as nitrogen, is first placed within the chamber 10 and the cover 11 is applied and sealed to the chamber 10. It will be noted that the chamber 10 and cover 11 are contoured to closely surround the pressure vessel 35 and thus reduce the clearance volume between the chamber and pressure vessel to a minimum. By thus reducing the clearance volume to a minimum, a large change in gauge readings may be produced by a small pressure change within the pressure vessel. The valves 16 and 24 are then opened and the valves 19 and 20 closed. The vacuum pump 21 is next started in operation and the clearance volume within the chamber 10 is evacuated by means of the pump to a test vacuum on the order of 50 to 200 microns. Since this is a relatively low order vacuum, it is possible to practice this method using a simple mechanical vacuum pump without resorting to the use of expensive high vacuum pumps.

Since the open end of the gauge line 15 terminates within the bulb 25, the pressure within the bulb will be the same as that within the clearance volume inside the chamber 10. A needle valve 36 on the reservoir 29 is now opened to permit atmospheric pressure, acting through a vent 37, to force the mercury 31 from the reservoir into the bulb 25. The mercury 31 is permitted to continue to rise until the level thereof in the tube 26 reaches the graduation 32, at which time the needle valve 36 is closed to preclude further movement of the mercury column. At this time the mercury within the gauge line 15 will have risen to the level 34. The difference in level, $h$, read on a scale 38, can then be applied to the Boyle's law formula to determine the initial pressure within the bulb 25 at the time the mercury reached the level 28. This pressure, of course, corresponds to the actual pressure within the clearance volume of the chamber 10.

The vent 37 is now connected to a vacuum pump (not shown) and the interior of the reservoir 29 evacuated with the needle valve 36 open to return the mercury within the gauge 14 to the level shown in FIG. 2; at which time the needle valve 36 is reclosed. After a predetermined period of time, the gauge is again operated to return the mercury 31 to the bulb 25 up to the graduation 32 as previously described. Assuming that there has been some leakage from the pressure vessel 35, the mercury level within the gauge line 15 will be higher than the level 34 as indicated at $h_2$ in FIG. 2. The difference in mercury levels within the gauge line 15 ($h_2-h$) is then a measure of the pressure rise in the clearance volume over the time period of the test. Using this pressure rise within the clearance volume, a quantitative leak rate for the pressure vessel 35 can then readily be computed either in terms of internal pressure drop or weight of gas lost. This leak rate may then be compared with a standard or maximum leak rate to determine whether the tightness of the vessel 35 is acceptable.

Figure 3:
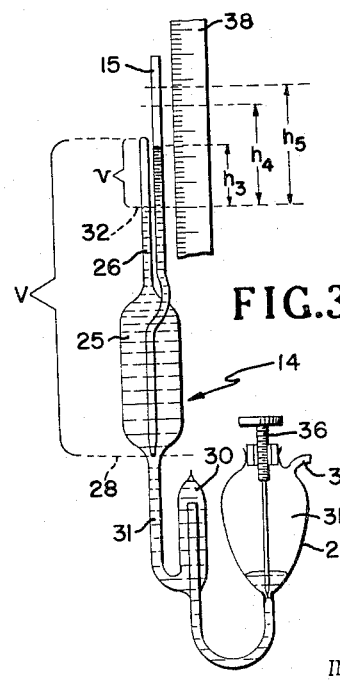
FIG. 3 is a view of a McLeod gauge similar to FIG. 2 wherein the gauge has been operated to raise the mercury columns and the difference in heights of these columns represents the measure of a vacuum to which the gauge is connected.

Attention is now directed to FIG. 3 for a description of another method by means of which the present invention may be practiced. The pressure vessel 35 is again sealed within the chamber 10 and the clearance volume evacuated as previously described. The valve 24 is then closed and the valve 20 in the calibrated leak line 18, is opened. The gauge 14 is then manipulated as previously described to determine the difference in mercury levels $h_3$ which is indicative of the pressure within the clearance volume. The mercury is then returned to the reservoir 29. At this time a predetermined quantity of the same dry gas with which the pressure vessel 35 is charged is introduced into the calibrated leak line 18 through the valve 20. The quantity of gas introduced into the line 18 between the valves 19 and 20 is preselected so as to cause a pressure rise in the clearance volume which corresponds to the maximum allowable leak rate of the vessel 35 over the period of the test. The valve 20 is then closed and the valve 19 opened to introduce the predetermined quantity of dry gas into the clearance volume.

The McLeod gauge 14 is again manipulated to obtain a reading of the new pressure within the clearance volume. This is designated $h_4$ in FIG. 3. The pressure change represented by the quantity $h_4-h_3$ is then the maximum allowable pressure change within the clearance volume over the time of the test. After the predetermined period of time, the gauge 14 is again manipulated to once more register the pressure within the clearance volume. Assuming that there has been some leakage from the vessel 35, the mercury column within the gauge line 15 will then reach a new level designated $h_5$ in FIG. 3. If the quantity $h_5-h_4$ is equal to or less than the quantity $h_4-h_3$, then the leak rate of the vessel 35 is acceptable. Otherwise, the leak rate of the vessel 35 is excessive. The ratio $h_5-h_4$ to $h_4-h_3$ multiplied by the maximum allowable leak rate will yield a quantitative expression of the actual leak rate of the vessel under test.

It will be readily apparent from the foregoing that the methods of practicing the present invention provide numerous advantages not available with prior art methods. For example, the present invention may be practiced by the use of low order test vacuums (50–200 microns) so that only a mechanical vacuum pump is needed. By using an evacuated chamber which has its internal surfaces contoured to closely fit the pressure vessels being tested, the clearance volume is maintained small and the leakage from the object being tested is actually amplified. This amplification is the ratio of the internal volume of pressure vessel to the clearance volume and results in minute changes in pressure within the pressure vessel being reflected in large changes in gauge reading with attendant accuracy. As previously pointed out, either of the methods of the present invention enable a quantitative determination of leak rate to be obtained whereas the prior art methods normally result only in the detection of leaks with no indication of the rate of such leaks. By tin plating the interior of chamber 10 and by using a low order test vacuum, the surface degassing problem presented by evacuating the clearance volume is minimized. Furthermore, any surface degassing caused by water vapor does not affect the results of the tests since the McLeod gauge utilized is a modified version without the usual chemical trap. Without the chemical trap, the McLeod gauge does not measure partial pressures due to the presence of water vapor since the vapor is substantially condensed during the compression of the test quantity of gas into the volume $v$. While this condensation may be considered undesirable in many of the applications of a McLeod gauge, this defect is actually used to an advantage in the present invention. This is due to the fact that the pressure vessels being tested are charged with a dry permanent gas which responds to Boyle's law whereas water vapor does not. Consequently, the gauge as used in the present invention indicates only changes in pressure due to the dry gas without being substantially affected by partial pressures exerted due to the presence of water vapor. The use of the calibrated leak enables quantitative leak rate determinations merely by measuring pressure changes on the test gauge. In other words, the calibrations or markings on the gauge need only be relative and absolute values of the actual vacuum in the clearance volume are not required for accurate results. The only practical limitation on the sensitivity of the methods of the present invention is the time of the test period, i.e., the time between the initial and final readings.

It is to be understood that the above described methods are simply illustrative of two preferred embodiments of the present invention. Numerous similar methods could be readily devised by those skilled in the art which would still embody the principles of the present invention and fall within the spirit and scope thereof.

What is claimed is:

1. A method for determining the quantitative leak rate of pressure vessels charged with a dry permanent gas comprising the steps of enclosing said pressure vessel in a sealed chamber, evacuating said chamber, determining the pressure rise over a predetermined period of time due only to leakage of said dry gas from said vessel with a vacuum gauge whose readings are substantially unaffected by the presence of a condensable vapor within said chamber, introducing a predetermined quantity of said dry gas into said chamber prior to the determination of the pressure rise due to leakage, and calibrating said gauge according to initial and final readings taken before and after introduction of said dry gas.

2. The method of claim 1 wherein said pressure rise is determined by the use of a McLeod gauge.

3. A method for determining the quantitative leak rate of pressure vessels charged with a dry permanent gas which follows Boyle's law comprising the steps of enclosing said pressure vessel in a sealed chamber so dimensioned as to provide a small clearance volume relative to the volume of said pressure vessel, evacuating said clearance volume to provide a moderately high vacuum, introducing a predetermined quantity of said dry gas into said chamber and determining with a vacuum gauge the pressure rise caused thereby to obtain a relative calibration of said gauge, and then determining with said gauge the further pressure rise if any within said chamber due to leakage of said dry gas from said vessel to obtain a quantitative measure of the leak rate of said vessel.

4. The method of claim 3 wherein the initial vacuum produced in said chamber is of sufficiently low order to preclude outgassing from the walls of said chamber and said pressure vessel.

5. The method of claim 3 wherein the pressure determinations are solely in terms of dry gas pressures and hence independent of any partial pressures due to the presence of condensable vapors.

6. The method of claim 3 wherein the pressure determinations are made with a McLeod gauge whose readings are substantially unaffected by the presence of a condensable vapor within said chamber.

References Cited by the Examiner

UNITED STATES PATENTS 2,507,321  5/50  Sherwood _____ 73—40.7
2,784,373  3/57  Lawrance _____ 73—49.3

OTHER REFERENCES

Bixler, H. J.: "Use of McLeod Gauges at Room Temperatures for Gases with High Critical Temperatures," Review of Scientific Instruments, vol. 31, No. 10, October 1960, page 1155.

ISAAC LISANN, *Primary Examiner.*